March 28, 1950     A. A. ROOD     2,502,279
SOFT-SEAT RELIEF VALVE
Filed June 20, 1945
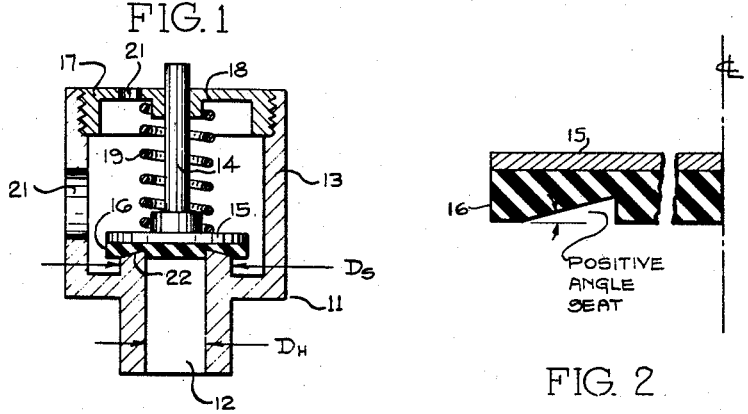
FIG. 1
FIG. 2
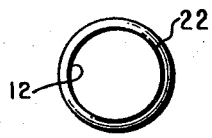
FIG. 3
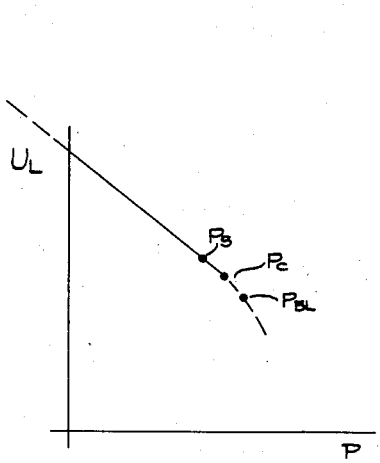
FIG. 4
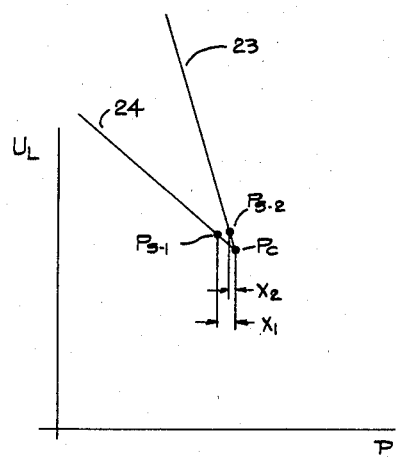
FIG. 5
INVENTOR
ALVIN A ROOD
BY *Richey & Watts*
ATTORNEYS Patented Mar. 28, 1950

2,502,279

UNITED STATES PATENT OFFICE 2,502,279

SOFT-SEAT RELIEF VALVE

Alvin A. Rood, Cleveland, Ohio, assignor to The Weatherhead Company, Cleveland, Ohio, a corporation of Ohio Application June 20, 1945, Serial No. 600,461

3 Claims. (Cl. 137—53)

My invention relates to relief valves or blow-off valves and concerns particularly soft-faced relief valves.

It is an object of my invention to provide an improved, efficient, reliable relief-valve, the characteristics of which and the required dimensions of which may may readily be calculated.

A further object of my invention is to provide an improved, more reliable method of designing relief valves and to diminish the cost of designing relief valves.

A further object is to obtain relatively little discrepancy between the sealing pressure and the cracking pressure in a relief valve, and likewise to obtain relatively little discrepancy between the blow-off or rapid-discharge pressure and the cracking pressure in a relief valve.

Another object of my invention is to diminish the amount of extra pressure required for full opening of the relief-valve after it has begun to crack. An object is also to provide an arrangement in which the lightest possible spring may be employed.

Still another object of my invention is to reduce to a minimum leakage of a relief valve of the soft-face type before the pressure is reached at which it is designed to blow off.

Still another object is to eliminate the necessity for trial and error in the design of relief valves for predetermined values of pressure at which the valve relieves.

Other and further objects, features and advantages will become apparent as the description proceeds.

In carrying out the invention in its preferred form, I provide an inlet port with a seating surface surrounding the port, and I provide a poppet with a soft face thereon, and a spring for pressing the poppet against the sealing surface around the inlet port. The spring serves for biasing the poppet to the closed position. The spring strength is sufficient to hold down the poppet against a force equal to the force which would be exerted by the pressure of the fluid to be relieved, multiplied by the area enclosed in the outer outline of the sealing surface around the exhaust port. This area is chosen instead of the cross-sectional area of the inlet port. The spring is thus designed to produce a unit loading on the resilient face equal to the unit pressure of the fluid, at the predetermined value at which the fluid pressure is to be relieved. Furthermore, I provide a relatively small area of seating surface.

A better understanding of the invention will be afforded by the following detailed description, considered in conjunction with the accompanying drawing, and the scope of the invention will be pointed out in the appended claims.

In the drawings;

Fig. 1 is a medial sectional view of a relief valve forming one embodiment of my invention;

Fig. 2 is a fragmentary enlarged sectional view of the apparatus of Fig. 1 showing a portion of the poppet and soft-face;

Fig. 3 is a plan view of the inlet port in the apparatus of Fig. 1;

Fig. 4 is a graph illustrating the principle involved in my invention; and

Fig. 5 is another graph illustrating the manner of obtaining small lag between sealing pressure and cracking pressure.

Like reference characters are used throughout the drawing to designate like parts.

An embodiment of my invention is shown by way of illustration in Fig. 1.

In the arrangement illustrated, there is a valve body 11 taking the form of a casting or the like including an inlet port 12 and a poppet-supporting bell or enlargement 13. A valve poppet is provided comprising a supporting stem 14 carrying a disc 15 to which is secured a valve face 16, composed of rubber or suitable synthetic rubber-like composition. For supporting the stem 14, a cap or the like 17 is threaded into the bell 13 and is provided with a bushing 18 in which the stem 14 is adapted to slide. For biasing the poppet 15 and the valve face 16 downward, a compression spring 19 is provided.

In order to allow fluid to escape readily, suitable openings 21 may be provided in the cap 17 and the bell 13.

A seating surface 22 is provided around the exhaust port 12, and I prefer to make the seating surface 22 frusto-conical in shape, that is having what may be called a positive angle seat with the apex of the cone above the seating surface 22 in the particular arrangement illustrated where the poppet 15 is above the inlet port 12.

In accordance with my invention, I may accurately determine the required strength of the spring 19 whether the seat angle is positive as illustrated in Figs. 1 and 2, is zero, or negative. However, I prefer to employ the positive angle seat as illustrated.

I have found that the required spring force may readily be calculated by assuming that the unit loading, that is the pressure in pounds per square inch acting on the seating surface 22 of the face 16 as a result of the force of the spring 19 pressing against the seating surface 22, is equal to the cracking pressure in pounds per square inch of the fluid pressing upward against the face 16 within the inlet port 12, when the poppet 15 "cracks" or just begins allowing fluid to escape. Employing symbols, I assume that the unit load in pounds per square inch on the area As of the seat material is the same as the unit pressure in pounds per square inch, over the area $A_h$ of the inlet port 12. I assume that $$U_{LC}=P_C$$

Then $$(U_L)\left(\frac{\pi}{4}\right)(D_S^2-D_H^2)+P_C\left(\frac{\pi}{4}\right)(D_H^2)=F$$

or, $$F=U_L A_S+P_C A_H=P_C A_T$$

where, $U_{LC}$ = unit load at cracking pressure
$U_L$ = unit load in units of force per unit area
$U_{Lo}$ = unit load @ 0 fluid pressure
$D_S$ = diameter of seat
$D_H$ = diameter of inlet port
$P_C$ = cracking pressure in units of force per unit area
$F$ = spring load in units of force
$A_S$ = area of seating surface
$A_H$ = area of inlet port
$A_T$ = area of seating surface plus area of port I have found that the area of the seating surface 22 should be made as small as possible without exceeding the unit loading which the facing material 16 will stand in order to have as little difference as possible between the seating pressure and the cracking pressure of the relief valve. Accordingly, I utilize a seating surface having an area determined by the following equation:

$$A_S=\frac{A_H P_C}{U_{Lo}-P_C}$$

and I make, $U_{Lo}$ = to the maximum unit loading which the face material is considered safely capable of withstanding. Having ascertained $A_S$ or $D_S$, the required spring force may then be calculated by the formula, $$F=U_L A_S+P_C A_H$$

or $$F=P_C(A_T)$$

The graph of Fig. 4 illustrates the relationship between unit loading of the valve face at the seat and pressure of the fluid in the port 12. It will be observed that the unit loading of the valve face material is the maximum when the pressure is zero, since the entire force of the spring 19 is then effective in pressing the face 16 against the seating surface 22. As the pressure increases, the unit loading progressively decreases linearly until the point $P_C$ is reached at which the unit loading equals the cracking pressure. In accordance with the principle which I have discovered, the cracking pressure is equal to the unit loading when the valve cracks; consequently, as the pressure increases, the valve is opened further and further, that is the poppet 15 is lifted so that the unit loading is no longer determined solely by the pressure in the port 12 and the force of the spring 19 but also depends upon loss of pressure head by escape of fluid through the annular nozzle formed by the space between the seating surface 22 and the face 16 when the poppet is partially lifted. It is represented by the dotted portion of the line to the right of the point $P_C$. The rapid-discharge or blowoff pressure is represented by the point $P_{BL}$. This is the pressure at which rapid discharge of fluid takes place. On the other hand, the pressure at which the relief valve re-seals after it has cracked with pressure falling, represented by the point $P_S$ is somewhat less than the pressure $P_C$.

I have found that this lag between the sealing pressure $P_S$ and the cracking pressure $P_C$ or the delay in sealing after the pressure has fallen to what was the cracking pressure, is governed by the rate of change of the unit loading with respect to fluid pressure and that the latter is equal to the negative ratio of the area of the relief port to the area of the seating surface, expressed by the symbols $$\frac{-A_H}{A_S}$$

In order to make this lag as small as possible, the slope of the curve expressing relationship between $U_L$ and $P$ should be as steep as possible. As shown in Fig. 5, a smaller lag between $P_C$ and $P_S$ may be obtained with the steep curve 23 than with the less steep curve 24.

In Fig. 5, $X_1$ represents the lag or the pressure difference between cracking pressure $P_C$ and sealing pressure $P_{S1}$ as the pressure falls along curve 24; and $X_2$ represents the lag or difference between cracking pressure $P_C$ and the sealing pressure $P_{S2}$ as pressure falls along steeper curve 23. Since the slope of the curves 23 and 24 equals $$\frac{-A_H}{A_S}$$

the steepest curve is obtained with the smallest value of $A_S$ or seating surface. Accordingly, I prefer to make the area of the facing surface that seats as small as it can be made without exceeding the unit loading which the facing material will safely withstand.

I have found that as soon as the unit load on the valve facing material becomes greater than the cracking pressure, the relief valve seats. The minimum of difference between cracking pressure and sealing pressure is obtained when the relationship between unit load and pressure is such that a given change in unit load is accompanied by the minimum change in pressure, which corresponds to the condition where the curves of Figs. 4 and 5 are the steepest.

Where the facing material is not soft enough to be deformed by the edges of the seating surface 22, it is an advantage to utilize a relatively steep angle of the seating surface as this tends to produce a smaller effective seating surface area.

The smaller the seating of the facing material area, the lower the spring load required, and accordingly the lighter the spring may be which is employed. This has an advantage in that with a lighter spring a smaller fluid pressure is required to hold the poppet valve open after the reaction of the seating surface has ceased to aid the lifting of the poppet 15. For this reason, by employing a small seating surface area and a light spring, a smaller difference between the cracking pressure and the rapid discharge pressure will be obtained.

While I have described my invention as embodied in concrete form, and as operating in a specific manner in accordance with the provisions of the Patent Statutes, it should be understood that I do not limit my invention thereto, since various modifications thereof will suggest themselves to those skilled in the art without departing from the spirit of my invention, the scope of which is set forth in the annexed claims.

What is claimed is:

1. The method of calculating spring-biased soft-face relief-valve dimensions in terms of cracking pressure desired, which comprises ascertaining the seating surface in terms of unit loading by the formula, $$A_S = \frac{A_H P_C}{U_{Lo} - P_C}$$

selecting the maximum unit loading which the face material is considered safely capable of withstanding, and ascertaining the required spring force by the formula, $$F = U_L A_S + P_C A_H$$

considering unit loading pressure on the face, equal to cracking pressure, where $A_S$ = the area of the seating surface,
$A_H$ = the area of the valve port,
$P_C$ = the cracking pressure in units of force per unit area,
$U_{Lo}$ = the unit loading on the face where the fluid pressure is zero,
$F$ = spring force,
$U_L$ = the unit loading on the face in units of force per unit area.

2. The method of calculating spring-biased soft-face relief-valve dimensions in terms of cracking pressure desired, which comprises ascertaining the seating surface in terms of unit loading by the formula, $$A_S = \frac{A_H P_C}{U_{Lo} - P_C}$$

selecting the maximum unit loading which the face material is considered safely capable of withstanding, and ascertaining the required spring force by the formula $$F = P_C A_T$$

where $A_S$ = the area of the seating surface,
$A_H$ = the area of the valve port,
$A_T$ = the area of the surface bounded by the outer outline of the seating surface,
$P_C$ = the cracking pressure in units of force per unit area,
$U_{Lo}$ = the unit loading on the face when the fluid pressure is zero,
$F$ = the spring force.

3. A relief valve for unloading fluid under pressure substantially at a predetermined nominal unit relief pressure, comprising an inlet port, a seating surface surrounding said inlet port, a poppet with a soft face thereon adapted to bear on said seating surface, and a hold-down spring adapted to urge said poppet face against said seating surface, said spring being of such a strength that when the unit pressure of fluid in said inlet port equals said predetermined nominal unit relief pressure, the soft face material is deformed against said seat by unbalanced force of said spring, said unbalanced spring force being great enough to urge the face material against the seat over an area such that the unit loading on the soft poppet face at said seating surface resulting from said unbalanced spring force equals the predetermined nominal unit relief pressure, any slight increase in unit fluid pressure in said inlet port above said nominal unit pressure reducing the unbalanced spring force to a value wherein the unit loading on said poppet face at the seating surface is less than said nominal unit pressure and fluid inlet pressure may act over the entire poppet face to crack the valve.

ALVIN A. ROOD.

REFERENCES CITED

The following references are of record in the file of this patent:

UNITED STATES PATENTS

| Number | Name | Date |
|---|---|---|
| 1,233,752 | Clark | July 17, 1917 |
| 2,110,481 | Crocker | Mar. 8, 1938 |
| 2,254,209 | Buttner | Sept. 2, 1941 |
| 2,364,812 | Pierson | Dec. 12, 1944 |
| 2,420,370 | Hamilton | May 13, 1947 |

FOREIGN PATENTS

| Number | Country | Date |
|---|---|---|
| 504,857 | Great Britain | May 2, 1939 |
| 548,801 | Great Britain | Oct. 26, 1942 |